(12) United States Patent
Matsuyama et al.

(10) Patent No.: US 9,903,029 B2
(45) Date of Patent: Feb. 27, 2018

(54) BIPOLAR-ELECTRODE ELECTROLYTIC CELL

(71) Applicant: Morinaga Milk Industry Co., Ltd., Tokyo (JP)

(72) Inventors: Koki Matsuyama, Higashiyamato (JP); Yamato Matsuzaki, Yokohama (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 111 days.

(21) Appl. No.: 14/966,202

(22) Filed: Dec. 11, 2015

(65) Prior Publication Data

US 2016/0097135 A1  Apr. 7, 2016

Related U.S. Application Data

(63) Continuation of application No. 14/007,429, filed as application No. PCT/JP2012/056378 on Mar. 13, 2012, now Pat. No. 9,309,600.

(30) Foreign Application Priority Data

Mar. 29, 2011 (JP) ................... 2011-072048

(51) Int. Cl.
*C25B 9/20* (2006.01)
*C02F 1/461* (2006.01)
*C25B 9/06* (2006.01)

(52) U.S. Cl.
CPC .......... *C25B 9/063* (2013.01); *C02F 1/46104* (2013.01); *C25B 9/20* (2013.01); *C25B 9/203* (2013.01); *C02F 2001/46128* (2013.01); *C02F 2201/004* (2013.01); *C02F 2201/46115* (2013.01)

(58) Field of Classification Search
CPC ..................................................... C25B 9/203
See application file for complete search history.

(56) References Cited

U.S. PATENT DOCUMENTS 3,719,272 A * 3/1973 Bodine ................. B65D 83/00
                                                                       206/503
4,978,023 A * 12/1990 Behlmann .............. A47J 41/00
                                                                       206/501

(Continued)

FOREIGN PATENT DOCUMENTS

| JP | 2005-251465 A | * | 9/2005 |
| JP | 2009-199906 A | * | 9/2009 |
| JP | 2010-058052 A | * | 3/2010 |

*Primary Examiner* — Harry D Wilkins, III
(74) *Attorney, Agent, or Firm* — Wood Herron & Evans LLP

(57) ABSTRACT

The invention is a bipolar-electrode electrolytic cell (1) which includes a chassis (2), an electrode plate (3) and a plate-shape spacer (4) having a concavity (25) disposing the electrode plate (3), wherein an unit cell (C), which is formed by connecting a plurality of spacers (4) in which the electrode plate (3) is disposed on the concavity (25) so that one plate surface of the electrode plate (3) is directed to one direction, is disposed inside the chassis (2). The bipolar-electrode electrolytic cell (1) includes engaged portions (35, 50 and 51) which are provided on any one of the concavity (25) of the spacer (4) or the electrode plate (3) and engaging portions (10A and 10B) which are formed the other portion with respect to the one portion.

6 Claims, 11 Drawing Sheets

(56) References Cited

U.S. PATENT DOCUMENTS

| | | | |
|---|---|---|---|
| 6,346,000 B1* | 2/2002 | Orr | H01R 13/514 |
| | | | 361/679.46 |
| 6,375,809 B1* | 4/2002 | Kato | A61L 2/10 |
| | | | 204/157.15 |
| 2005/0115825 A1* | 6/2005 | Frank | C25B 9/06 |
| | | | 204/253 |
| 2007/0187254 A1* | 8/2007 | Thiele | C25B 1/285 |
| | | | 205/344 |
| 2009/0127152 A1* | 5/2009 | Bou-Mezrag | B65D 21/0231 |
| | | | 206/507 |
| 2012/0043726 A1* | 2/2012 | Zubia | E21B 33/085 |
| | | | 277/322 |
| 2012/0261255 A1* | 10/2012 | Matsuyama | C02F 1/46104 |
| | | | 204/275.1 |

\* cited by examiner

BIPOLAR-ELECTRODE ELECTROLYTIC CELL

CROSS-REFERENCE TO RELATED APPLICATIONS

This application is a Continuation of U.S. patent application Ser. No. 14/007,429, entitled "BIPOLAR-ELECTRODE ELECTROLYTIC CELL," filed on Sep. 25, 2013 (pending), which is a 371 of International Patent Application Serial No. PCT/JP2012/056378 filed on Mar. 13, 2012, which claims priority to Japanese Patent Application No. 2011-072048, filed on Mar. 29, 2011, the disclosures of which are hereby incorporated by reference herein.

TECHNICAL FIELD

The present invention relates to a bipolar-electrode electrolytic cell included in an electrolysis water-making apparatus which generates electrolysis sterilized water. Priority is claimed on Japanese Patent Application No. 2011-072048, filed Mar. 29, 2011, the content of which is incorporated herein by reference.

BACKGROUND ART

In the related art, in order to generate electrolysis sterilized water which sterilizes and cleans food or an apparatus for manufacturing food in a food manufacturing field or the like, an electrolytic water manufacturing apparatus including a bipolar-electrode electrolytic cell is used (for example, Patent Document 1). In the bipolar-electrode electrolytic cell, a large number of electrode plates formed from titanium oxide or the like are arranged, insulation spacers are respectively disposed between the electrode plates so as not to short-circuit the adjacent electrode plates, and unit cells are independently formed and respectively between the electrode plates. A catalyst coated on a base material of the electrode plate of the electrolytic cell is formed from noble metals such as platinum (Pt) or iridium (Ir), which are expensive. Thus, the cost can be reduced by coating the catalyst thin on a surface of titanium metal which is relatively inexpensive and has excellent strength, workability and corrosion resistance. In addition, since the generated materials are different from each other in a cathode and an anode, different catalysts may be used. Usually, the electrode plate of hydrochloric acid electrolysis which is obtained by coating, the catalyst such as Pr or Ir on the base material formed of titanium is used. Specifically, Pt or Ir is essential to generate chlorine gas on an anode surface and the life of the electrode is increased in proportion to the coated amount. Meanwhile, Pt or Ir is not essential to generate hydrogen gas on the cathode surface and the catalyst different from the anode surface may be coated. In addition, in a case where the base material is formed of titanium, hydrogen gas may be generated even though the coating of the catalyst is not present. Thus, coating only one surface of the electrode plate is coated can be used so that the simplest electrode in which both cathode and anode surfaces are present on the front and rear of one electrode plate is provided. Accordingly, in the assembly of the bipolar-electrode electrolytic cell, one plate surface on which platinum, iridium oxide or the like is coated, is directed to be a plus side, and then the electrode plate and the spacer are disposed. In other words, chloride is generated on the one plate surface and hydrogen is generated on the other plate surface.

CITATION LIST

Patent Literature

[Patent Document 1] Japanese Unexamined Patent Application, First Publication No. 2010-058052

SUMMARY OF INVENTION

Technical Problem

However, according to a bipolar-electrode electrolytic cell of the related art described above, an electrode plate is disposed on a spacer by observing the front and rear of a plate surface of the electrode plate and by determining the direction of the plate surface. Thus, the electrolytic cell may be assembled in which normal electrolysis cannot be performed by disposing the electrode plate on the spacer in a wrong direction.

In addition, the wrong disposition of the electrode plate described above leads to reduce electrolysis efficiency of the bipolar-electrode electrolytic cell in the early stage.

In addition, in order to prevent the wrong disposition of the electrode plate described above, it is necessary to dispose the electrode plate after sufficiently checking the front and rear of the electrode plate. Thus, the efficiency of assembly work of the bipolar-electrode electrolytic cell is reduced due to the determination of the front and rear of the plate surface of the electrode plate.

The invention has been accomplished in considering the above described problems and provides a bipolar-electrode electrolytic cell in which a direction of an electrode plate to a spacer is easily determined, wrong assembly of the bipolar-electrode electrolytic cell can be prevented easily and reliably, and reduction of an electrolysis efficiency in the early stage can be prevented.

Solution to Problem

The invention provides following means to solve the above problems. That is, a bipolar-electrode electrolytic cell according to a first invention of the present application includes a chassis; an electrode plate performing electrolysis in electrolyte solution and generating electrolyzed products; and a plate-shaped spacer having a concavity on which the electrode plate is disposed in which a unit cell, which is formed by connecting a plurality of spacers in which the electrode plate is disposed on the concavity so that one plate surface of the electrode plate is directed to one direction, is disposed inside the chassis. In addition, the bipolar-electrode electrolytic cell includes an engaged portion which is provided on any one side of the concavity of the spacer and the electrode plate; and an engaging portion which is formed on the other portion with respect to the one side portion. The engaged portion and the engaging portion are positioned so as to correspond to each other, and are formed to dispose the electrode plate inside the concavity, when the one plate surface of the electrode plate is disposed on the concavity toward the one direction. Furthermore, the engaged portion and the engaging portion are positioned so as not to correspond to each other, and are prevented from disposing the electrode plate inside the concavity, when the other plate surface of the electrode plate is disposed on the concavity toward the one direction.

In bipolar-electrode electrolytic cell of a second invention of the application according to the first invention, the engaged portion is a projecting wall or a projecting part formed on the concavity, and wherein the engaging portion is a cut-out portion or a hole formed on the electrode plate.

In bipolar-electrode electrolytic cell of a third invention of the application according to the first or second invention, the spacer has a latching portion formed on the plate surface and a latched portion which latches the latching portion of another spacer and performs connection thereto.

In bipolar-electrode electrolytic cell of a fourth invention of the application according to the third invention, a fitting convex portion is formed on the one plate surface of the spacer and a fitting concave portion, which is fitted into the fitting convex portion of the one plate surface of the other spacer and holds the connection between spacers, is formed on the other plate surface of the spacer.

Advantageous Effects of Invention

According to the bipolar-electrode electrolytic cell of the invention, the engaged portion and the engaging portion are formed on the electrode plate and the spacer, respectively so that the engaged portion and the engaging portion are positioned to correspond to each other and can dispose the electrode plate inside the concavity, when one plate surface of the electrode plate is disposed on the concavity toward one direction. Meanwhile, the engaged portion and the engaging portion are formed on the electrode plate and the spacer, respectively so that the engaged portion and the engaging portion are positioned so as not to correspond to each other and are prevented from disposing the electrode plate inside the concavity, when the other plate surface of the electrode plate is disposed on the concavity toward one direction. In other words, the electrode plate cannot be assembled to the spacer other than a predetermined direction of the electrode plate. Accordingly, when the front and rear of the electrode plate is provided in distinguished way, the electric plate does not get disposed in a wrong direction. Accordingly, corrosion of the electrode plate can be avoided due to a wrong disposition of the electrode plate, and reduction of the electrolysis efficiency of the bipolar-electrode electrolytic cell in the early stage can be avoided. In addition, peeling of the coating of the electrode plate can be avoided, and the short life of the electrode plate is prevented.

In addition, according to the bipolar-electrode electrolytic cell of the invention, the electrolysis efficiency of the bipolar-electrode electrolytic cell can be maintained for a long period.

In addition, according to the bipolar-electrode electrolytic cell of the invention, since determination of the direction of the electrode plate is easily performed, the assembly of the bipolar-electrode electrolytic cell can be performed simply and efficiently.

DESCRIPTION OF EMBODIMENTS

Figure 1:
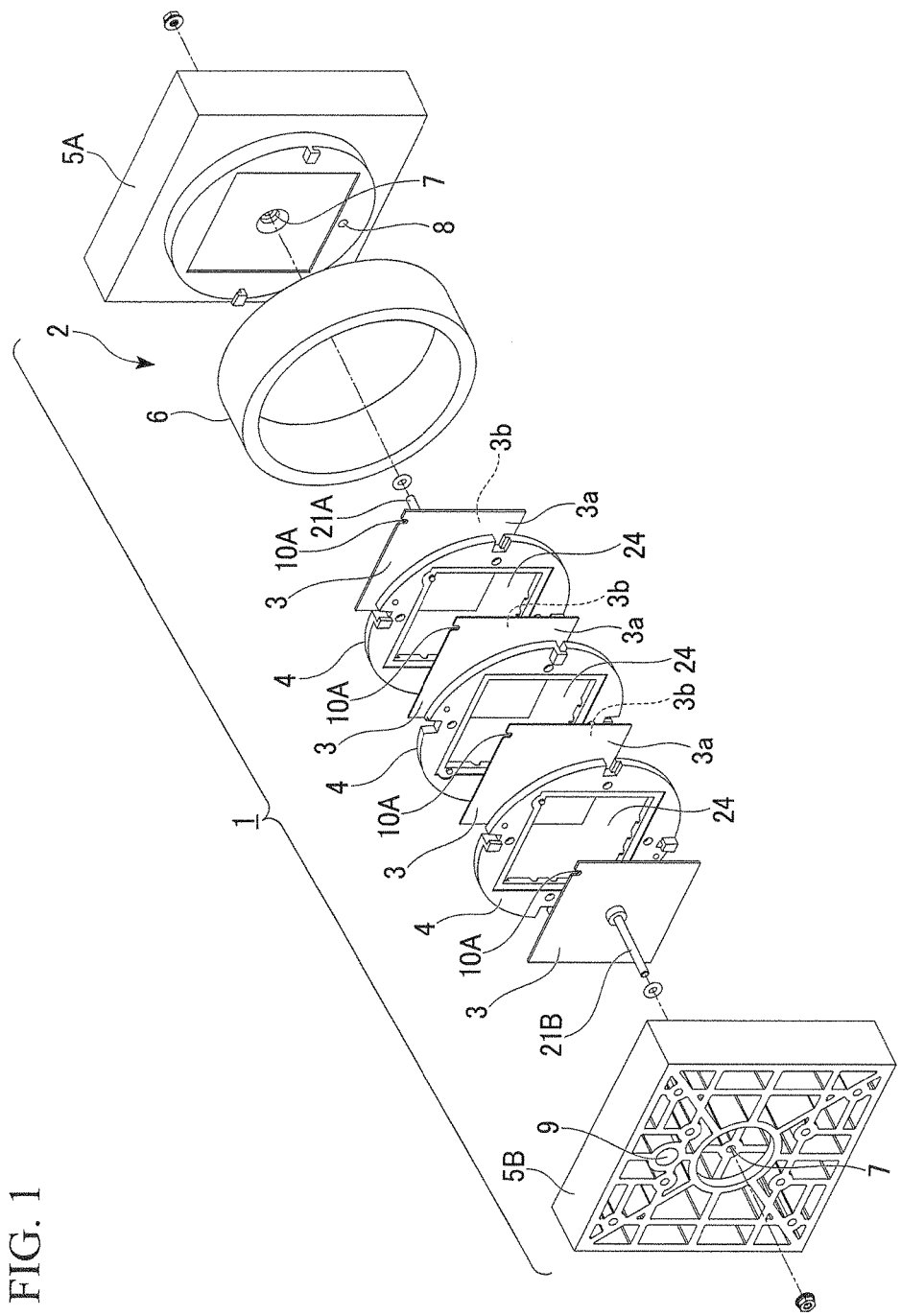
FIG. 1 is a view illustrating a bipolar-electrode electrolytic cell illustrated as a first embodiment of the invention, and is an exploded perspective view of the bipolar-electrode electrolytic cell viewed from one direction.

Hereinafter, an embodiment of a bipolar-electrode electrolytic cell of the invention will be described referring to the drawings.

First Embodiment

FIG. 1 is a view illustrating a first embodiment of the bipolar-electrode electrolytic cell according to the invention and is an exploded perspective view of a bipolar-electrode electrolytic cell 1 viewed from one direction. As illustrated in FIG. 1, the bipolar-electrode electrolytic cell 1 has a plurality of electrode plates 3 and a plurality of spacers 4 inside a chassis 2.

The chassis 2 includes side plates 5A and 5B, and a body 6. They are formed from a synthetic resin such as vinyl chloride resin, carbonate resin and acrylic resin.

The side plates 5A and 5B are plate-shaped members which appear to have a rectangular shape with a predetermined thickness. Electrode through holes 7, which pass through the center portion of the side plates 5A and 5B in the thickness direction thereof, respectively, are formed in the side plates 5A and 5B. In addition, at a lower portion of the side plate 5A, a supplying hole 8 for supplying an electrolyte solution which passes through the thickness direction thereof is formed, and at an upper portion of the side plate 5B, an extracting hole 9 for extracting electrolyzed products which passes through the thickness direction thereof is formed.

Figure 2:
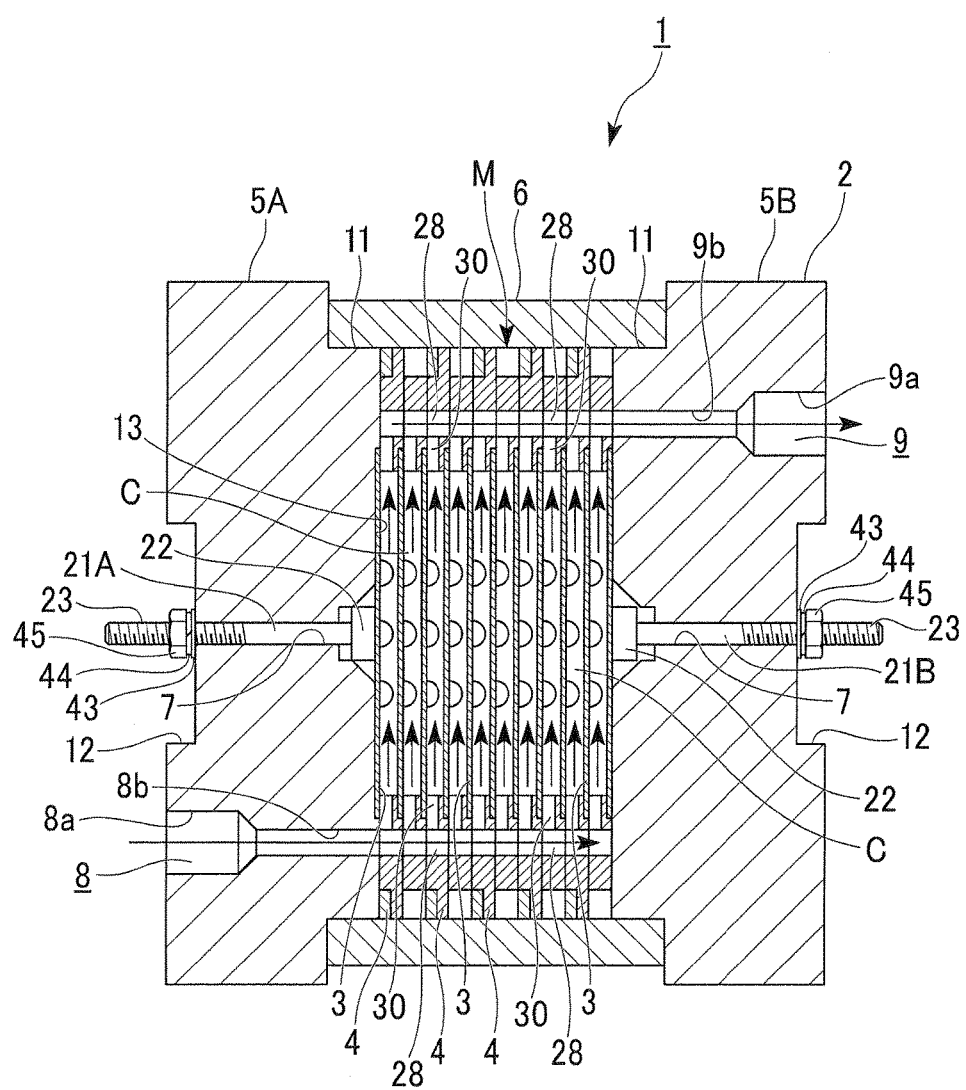
FIG. 2 is a vertical cross-sectional view of the bipolar-electrode electrolytic cell illustrated as the first embodiment of the invention.

FIG. 2 is a vertical cross-sectional view of the bipolar-electrode electrolytic cell 1 in an assembled state and illustrates a cross-section in the center of the electrode through hole 7 in FIG. 1. As illustrated in FIG. 2, the side plates 5A and 5B have engaging concavities 11 formed on inner surfaces thereof which are opposed, respectively, and have concave portions 12 formed on the center portion of the outer surfaces thereof, respectively. In addition, the supplying hole 8 includes a large diameter portion 8a and a small diameter portion 8b, and the extracting hole 9 includes a large diameter portion 9a and a small diameter portion 9b. In addition, the center portion of the inner surface of the side plate 5A has a concavity 13 to fit the electrode plate 3.

The body 6 is a cylindrical member. The side plate 5A is fixed to one end portion of the body 6 and the side plate 5B is fixed to the other end portion thereof.

The electrode plate 3 is a plate-shaped member made from a metal such as titanium alloy. For example, coating of platinum for the anode is applied to one plate surface 3a of the electrode plate 3. It is desirable that Coating for the cathode is applied to the other plate surface 3b. However, in the first embodiment, the coating is not applied to the other plate surface 3b.

In addition, as illustrated in FIG. 1, the electrode plate 3 is formed in a substantially square shape viewed in a plan view. Furthermore, one end side of an outer periphery of the electrode plate 3 has a cut-out portion 10A of which a shape of the periphery has a substantially U shape.

The cut-out portion 10A is an engaging portion which is paired with an engaged portion of the spacer 4 described below. If the electrode plate 3 is directed so that the outer periphery having the cut-out portion 10A is positioned on the upper end when the one plate surface 3a of the electrode plate 3 is viewed in a plan view, the cut-out portion 10A is formed to open to the upper side in the right end side of the electrode plate 3.

Each electrode plate 3, 3 . . . is disposed side by side in such a manner that the one plate surface 3a on which the coating is applied is directed in one direction between the side plates 5A and 5B which are disposed facing each other having a predetermined dimensions. As illustrated in FIG. 2, metal electrode bars 21A and 21B are fixed to center portion of the electrode plate 3 which is disposed on both ends in each electrode plate 3, 3 . . . .

Heads 22 are formed on one end portion in the electrode bars 21A and 21B, and male thread portions 23 are formed on the outer surface of the other end portion. In addition, the Heads 22 are fixed to the center portion of the electrode plate 3.

As illustrated in FIG. 1, the spacer 4 is a plate-shaped member formed from a synthetic resin such as vinyl chloride resin and carbonate resin, and is formed in a circular shape when viewed in a plan view so as to fall into the inside of the cylindrical body 6. Each spacer 4, 4 . . . is disposed between each electrode plate 3, 3 . . . so as to be disposed alternately with each electrode plate 3, 3 . . . , and is disposed side by side in such a manner that each one plate surface thereof is directed in one direction between the side plates 5A and 5B.

The spacer 4 is illustrated in FIGS. 3A to 3C, 4A and 4B. As illustrated in the figures, the spacer 4 is a circular plate-shaped member and has a hollow hole 24 which passes through the center portion of the plate surface in a direction (in other words, the thickness direction) between the plate surfaces. A contour of the hollow hole 24 is a square when viewed in a plan view. In addition, a dimension of each side configuring the contour of the hollow hole 24 is slightly smaller than the dimension of each side configuring the outer periphery of the electrode plate 3 described above.

The one plate surface 4a of the spacer 4 has a concavity 25 which is recessed in the thickness direction thereof along an inner wall surface of the hollow hole 24. In other words, the concavity 25 is formed with a constant width dimension substantially along each side of the hollow hole 24 to be recessed in the thickness direction of the spacer 4, and includes four concave portions 25a to 25d along each side thereof.

A bottom surface y of one end side of the concave portion 25a has a projecting part 35 protruding in the direction (the thickness direction) between the plate surfaces 4a and 4b of the spacer 4. As illustrated in FIG. 4B, the projecting part 35 is an engaged portion which is formed in a substantially circular column shape. As illustrated in FIGS. 5A and 5B, when the other plate surface 3b of the electrode plate 3 is opposite to the bottom surface y of the concavity 25, since the cut-out portion 10A of the electrode plate 3 and the projecting part 35 of the spacer 4 are positioned and engaged corresponding to each other, the electrode plate 3 can be disposed inside the concavity 25. As illustrated in FIGS. 10C and 10D, when the coated one plate surface 3a is opposite to the bottom surface y of the concavity 25, the cut-out portion 10A of the electrode plate 3 and the projecting part 35 of the spacer 4 are not positioned corresponding to each other. In other words, since the engagement position (the engagement position of the cut-out portion 10A and the projecting part 35 each other) of the electrode plate 3 and the spacer 4 do not fit each other, disposition of the electrode plate 3 inside the concavity 25 is prevented.

In other words, when the other plate surface 3b of the electrode plate 3 is opposite to the bottom surface y of the concavity 25 (in a case of FIG. 5A), since the positions of the projecting part 35 of the spacer 4 and the cut-out portion 10A of the electrode plate 3 illustrated in FIG. 5B correspond to each other, both can be engaged. Meanwhile, when the electrode plate 3 illustrated in FIG. 5A is turned over and directed as illustrated in FIG. 10C, since the positions of the projecting part 35 and the cut-out portion 10A are not aligned with each other even though the other plate surface 3b is rotated to a certain angle, the electrode plate 3 contacts the projecting part 35 and the electrode plate 3 cannot be disposed inside the concavity 25.

The concavity 25 is provided in the periphery of the projecting part 35 by rounding the circumference thereof so as to bypass the projecting part 35.

As described above and as illustrated in FIGS. 5A and 5B, only when the electrode plate 3 is directed in one direction, the electrode plate 3 can be fitted inside the concavity 25 of the spacer 4.

In addition, the concavity 25 has a rectangular shape substantially along each side of the hollow hole 24. The dimension outside of each side of the rectangular shape is slightly larger than the dimension of each side of the electrode plate 3. Accordingly, the electrode plate 3 is fitted inside the concavity 25 without a clearance and the electrode plate 3 is fixed so as not to move in a direction along the plate surface of the spacer 4. In addition, the depth of the concavity 25 in the thickness direction is substantially the same dimension as the thickness of the electrode plate 3. Accordingly, when the electrode plate 3 is fitted, the plate surface 3a of the electrode plate 3 and the plate surface 4a of the spacer 4 have the same surface as each other.

Figure 4A:
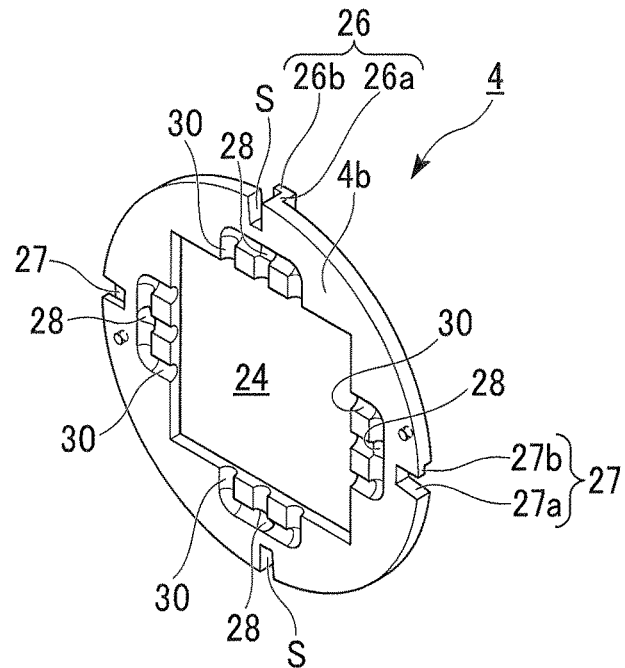
FIG. 4A is a view illustrating the spacer of the bipolar-electrode electrolytic cell illustrated as the first embodiment of the invention, and is a perspective view of the spacer viewed from in a rear direction.
Figure 4B:
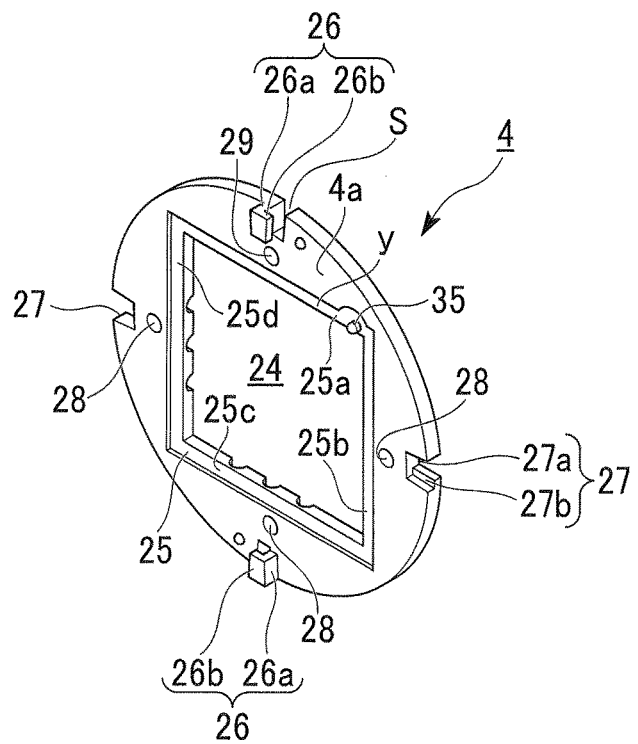
FIG. 4B is a view illustrating the spacer of the bipolar-electrode electrolytic cell illustrated as the first embodiment of the invention, and is a perspective view of the spacer viewed from in a front direction.
Figure 5A:
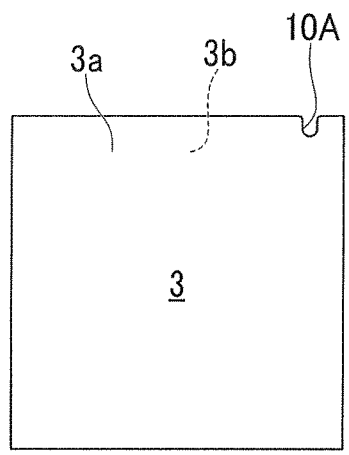
FIG. 5A is a view illustrating an electrode plate of the bipolar-electrode electrolytic cell illustrated as the first embodiment of the invention, and is a front view of the electrode plate.
Figure 5B:
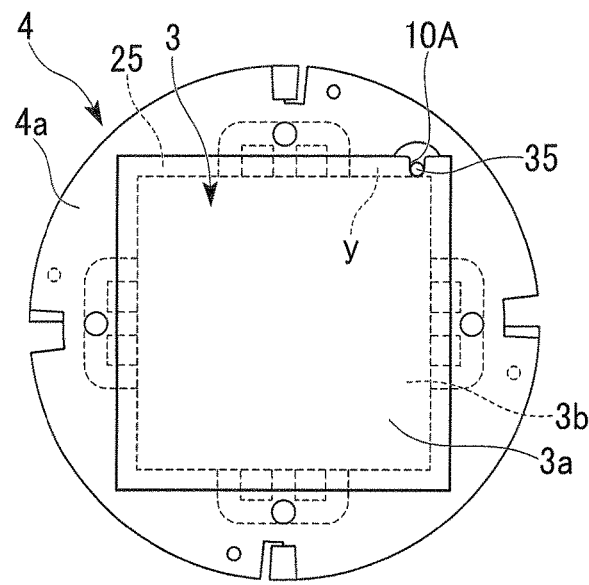
FIG. 5B is a view illustrating the spacer of the bipolar-electrode electrolytic cell illustrated as the first embodiment of the invention, and is a front view of the spacer into which the electrode plate illustrated in FIG. 5A is fitted.
Figure 6:
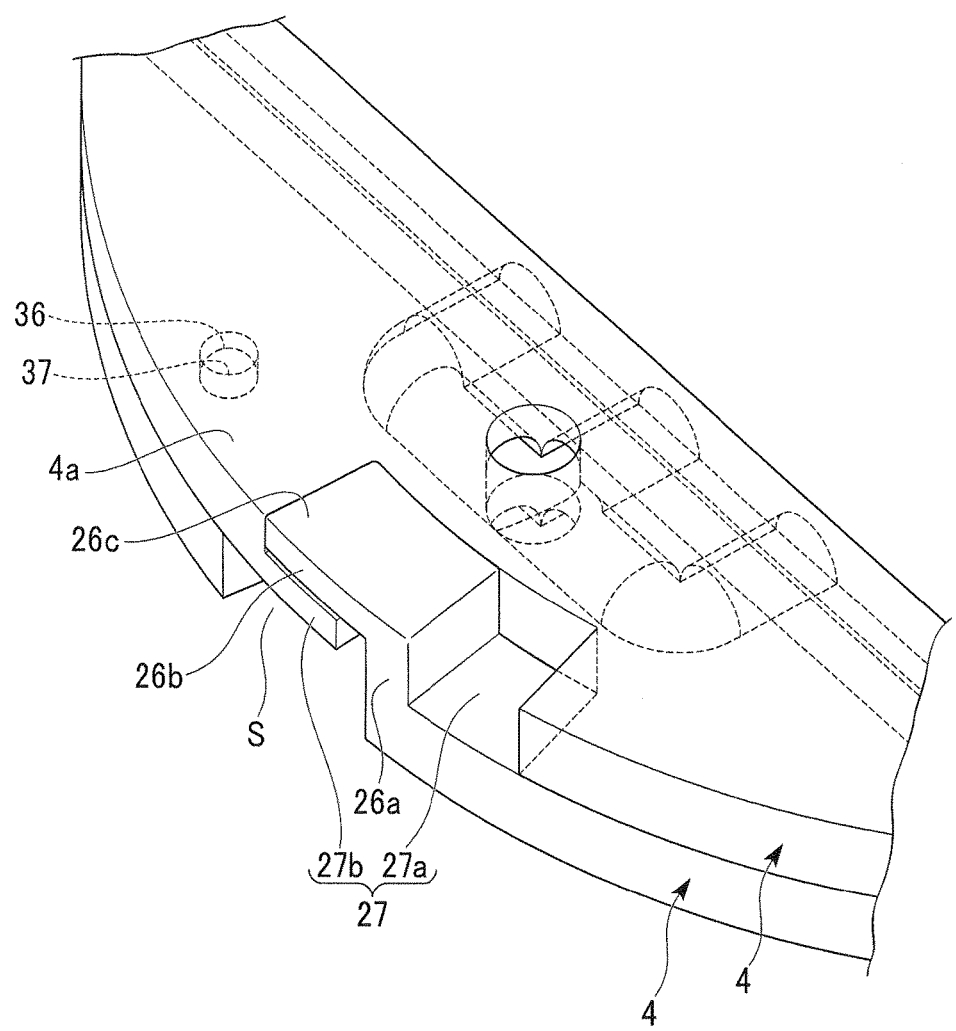
FIG. 6 is an enlarged perspective view illustrating a connection state between the spacers of the bipolar-electrode electrolytic cell illustrated as the first embodiment of the invention.

As illustrated in FIGS. 4A and 4B, in the spacer 4, latching portions 26 and 26 are formed on upper and lower portions of the hollow hole 24, and latched portions 27 and 27, which latch the latching portions 26 and 26, are formed on the periphery portion of both sides in the right and left of the hollow hole 24. As illustrated in FIG. 6, the latching portion 26 and the latched portion 27 make the adjacent spacers 4 and 4 to be coupled with each other. Each of the spacers 4 and 4 is connected and coupled by latching the latching portions 26 and 26 of the other spacer 4 to the latched portions 27 and 27 of the one spacer 4 in the spacers 4 and 4 which are adjacent to each other.

As illustrated in FIGS. 4A and 4B, the latched portion 27 is formed on the periphery portion of the spacer 4 and includes a concave portion 27a which is recessed in the hollow hole 24 side of the spacer 4 and in which the latching portion 26 is entered, and a fitting concavity 27b which is recessed in the thickness direction of the spacer 4 in the lateral direction of the outer periphery direction of the concave portion 27a.

The latching portion 26 is formed on the peripheral portion which is rotated 90 degrees from a position in which the latched portion 27 is formed. The latching portion 26 includes a rising wall portion 26a which rises from the plate surface 4a and an extending portion 26b which is bent laterally from the rising wall portion 26a so as to be parallel to the plate surface 4a and along the outer periphery of the spacer 4.

As illustrated in FIG. 6, the thickness of the extending portion 26b is formed of the same dimension as the depth dimension of a recess from the other plate surface 4a of the other spacer 4 to the fitting concavity 27b. When the extending portion 26b of the latching portion 26 is overlapped and latched on the fitting concavity 27b of the latched portion 27, the plate surface 26c of the extending portion 26b and the plate surface 4a of the other spacer 4 have substantially the same surface as each other. In addition, lower side of the extending portion 26b is a space portion S.

A fitting convex portion 36 is formed on the side of circumferential direction of the space portion S which is positioned on the lower side of the extending portion 26b. Meanwhile, a fitting concave portion 37, which is fitted with the fitting convex portion 36 when the latching portion 26 of one spacer 4 is latched on the latched portion 27 of the other spacer 4 which are adjacent to each other, is formed on the side of the fitting concavity 27b of the latched portion 27.

In addition, the latching portion 26 of the spacer 4 of the plurality of spacers 4, 4 . . . , which is nearest to the side plate 5B, is latched on a latched portion (not illustrated) formed on the side plate 5B. Meanwhile, the latched portion 27 of the spacer 4, which is nearest to the side plate 5A, is latched on a latching portion (not illustrated) formed on the side plate 5A.

In addition, as illustrated in FIG. 4B, the spacer 4 has liquid through holes 28, 28 . . . , through which electrolyte solution passes, formed outside the center portion of the concave portions 25a and 25c which forms the concavity 25 in the right-left direction, and outside of the center portion of the convex portions 25b and 25d in the up-down direction, respectively.

The liquid through hole 28 is a hole which passes through in the direction between the plate surfaces 4a and 4b (the thickness direction) of the spacer 4. A flow passage 30 formed on the plate surface 4b connects between the liquid through hole 28 and the hollow hole 24, and the electrolyte solution introduced in the liquid through hole 28 is guided inside the hollow hole 24 through the flow passage 30 as described below.

Figure 3A:
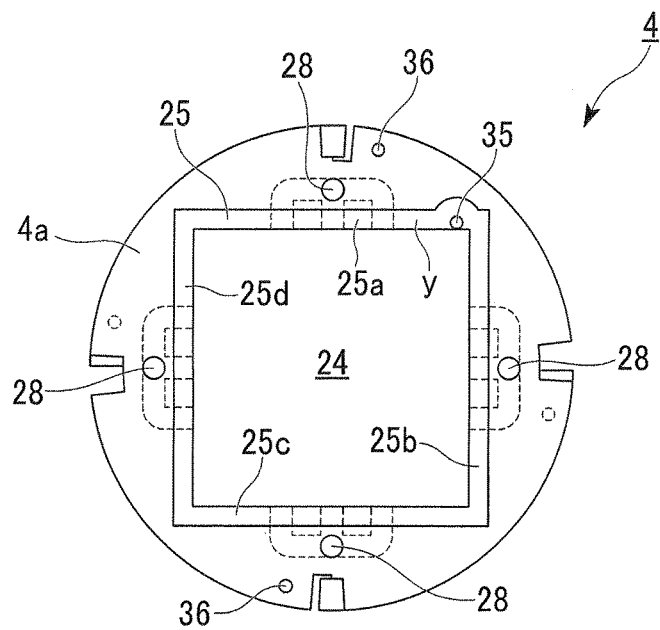
FIG. 3A is a view illustrating a spacer of the bipolar-electrode electrolytic cell illustrated as the first embodiment of the invention, and is a front view of the spacer.
Figure 3B:
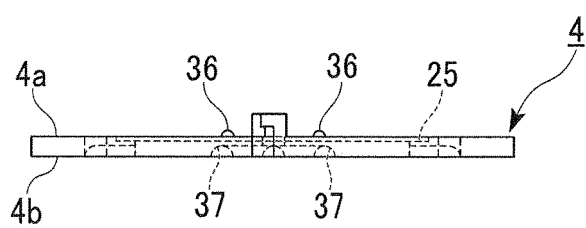
FIG. 3B is a view illustrating the spacer of the bipolar-electrode electrolytic cell illustrated as the first embodiment of the invention, and is a side view of the spacer.
Figure 3C:
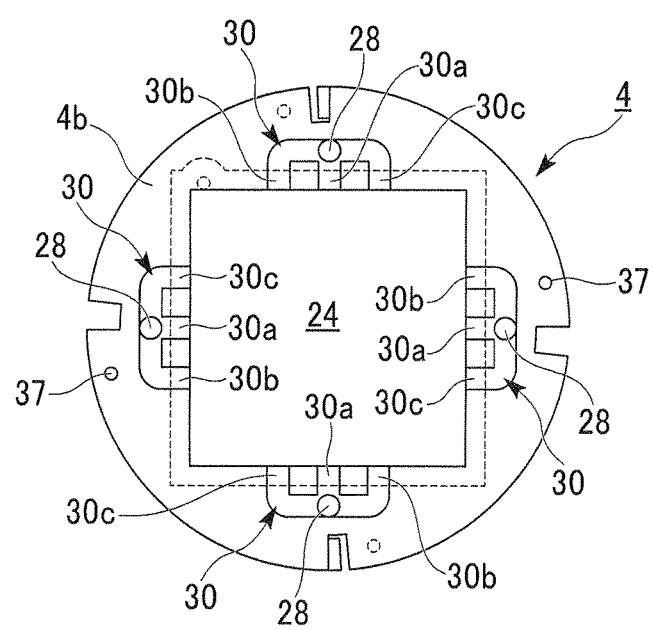
FIG. 3C is a view illustrating the spacer of the bipolar-electrode electrolytic cell illustrated as the first embodiment of the invention, and is a rear view of the spacer.

As illustrated in FIG. 4A, the flow passage 30 is a groove formed on the plate surface 4b. As illustrated in FIG. 3C, the flow passage 30 includes a groove 30a which is straightly extended from the liquid through hole 28 toward the hollow hole 24 and grooves 30b and 30c which are extended from the liquid through hole 28 along the end periphery of the hollow hole 24 in both directions, and which are bent in an intermediate portion thereof and then are extended toward the hollow hole 24.

In addition, as illustrated in FIG. 2, the liquid through hole 28, which is positioned on the lower portion of an unit cell C when disposed inside the chassis 2, is an inlet which supplies the electrolyte solution. In addition, the liquid through hole 28, which is positioned on the upper portion of the unit cell C is an outlet of the electrolyzed products of the electrolyte solution. Furthermore, the liquid through holes 28 positioned on the right and left of the unit cell C are liquid-level adjustment holes which communicate with the inside of each unit cell C through the flow passage 30 and adjust a liquid level of the electrolyte solution which invades in the unit cell C.

Figure 5C:
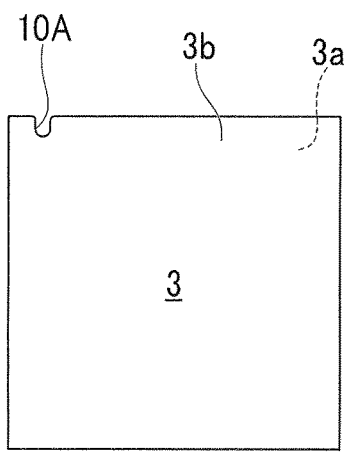
FIG. 5C is a view illustrating the electrode plate of the bipolar-electrode electrolytic cell illustrated as the first embodiment of the invention, and is a rear view of the electrode plate.
Figure 5D:
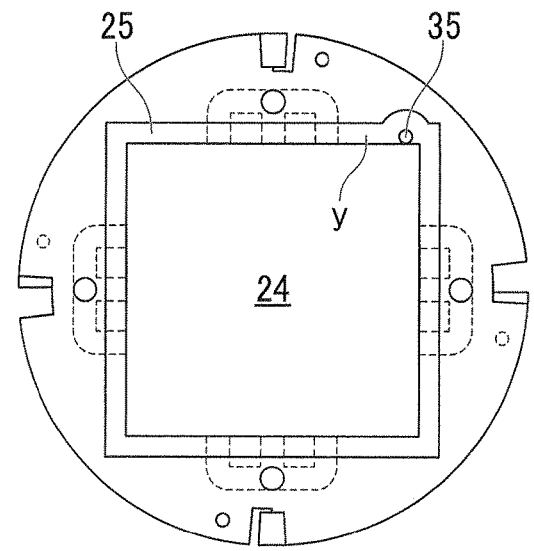
FIG. 5D is a view illustrating the spacer of the bipolar-electrode electrolytic cell illustrated as the first embodiment of the invention, and is a front view of the spacer.

The bipolar-electrode electrolytic cell 1 described above is assembled as follows. First, as illustrated in FIG. 5B, the other plate surface 3b on which the coating is not applied is opposite to the bottom surface y of the concavity 25, and the electrode plate 3 is disposed inside the concavity 25 so that the cut-out portion 10A of the electrode plate 3 is directed in the engagement direction with the projecting part 35 of the spacer 4. At this time, as illustrated in FIG. 5C, when the direction of the electrode plate 3 is opposite to the direction described above, in other words, when the one plate surface 3a on which the coating is applied is disposed to be opposite to the bottom surface y of the concavity 25, since the positions of the cut-out portion 10A and the projecting part 35 are not aligned with each other, the disposition of the electrode plate 3 on the concavity 25 is prevented by the projecting part 35.

Figure 7:
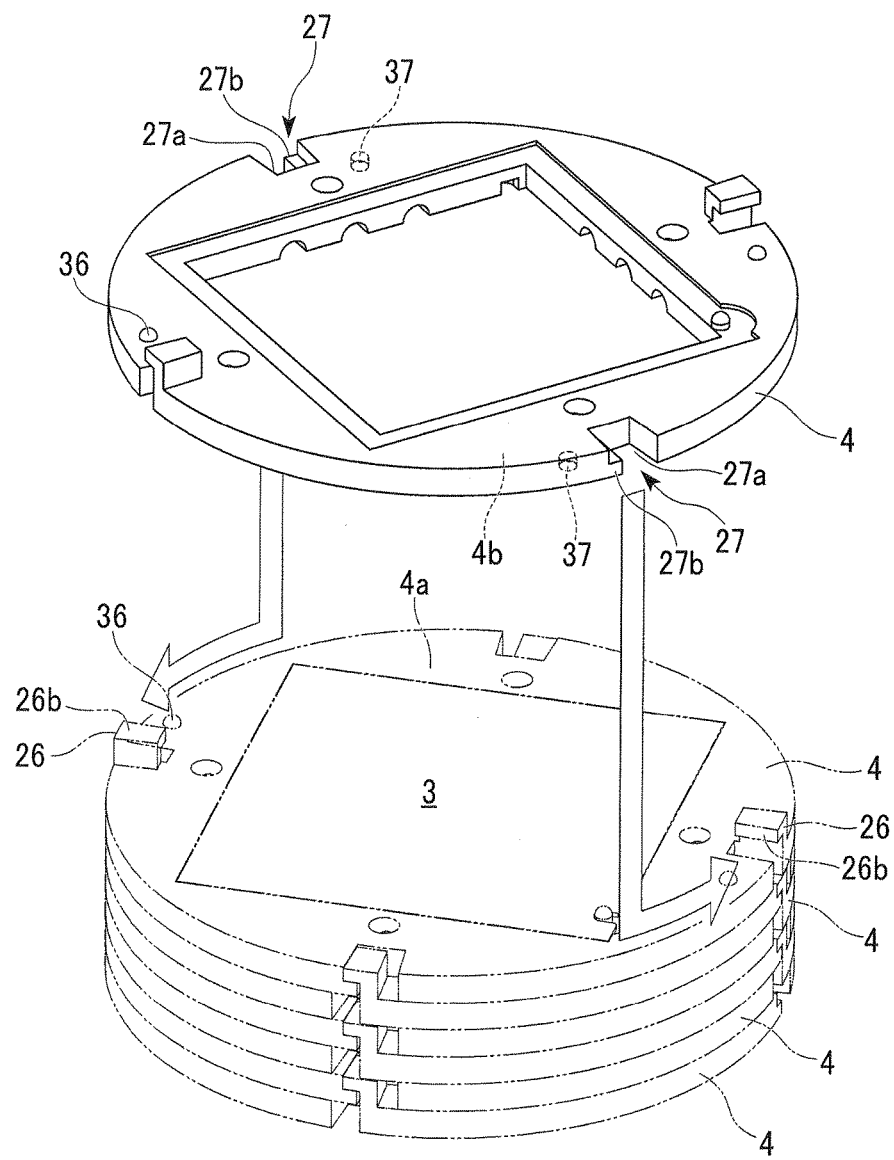
FIG. 7 is an explanatory view illustrating a connection method of the electrode plate and the spacer of the bipolar-electrode electrolytic cell illustrated as the first embodiment of the invention.

Then, as illustrated in FIG. 7, the spacer 4 on which the electrode plate 3 is disposed is overlapped and fixed to the other spacer 4 on which the electrode plate 3 is disposed. In other words, the latching portion 26 of the one spacer 4 enters the concave portion 27a of the latched portion 27 of the other spacer 4. Therewith, a front end of the extending portion 26b of the latching portion 26 is latched on a front end of the fitting concavity 27b of the latched portion 27, and the plate surfaces 4a and 4b of the spacers 4 and 4 which are opposite to each other, are approaching each other. As a result, the fitting convex portion 36 formed on the plate surface 4a of the one spacer 4 contacts the plate surface 4b of the other spacer 4, and close contact between the plate surfaces 4a and 4b of the spacers 4 and 4 which are linked with each other is prevented. Therewith, the latching portion 26 is elastically deformed to outside the plate surface 4a of the one spacer 4 by the fitting concavity 27b of the latched portion 27. In addition, the fitting concavity 27b of the latched portion 27 is elastically deformed to outside the plate surface 4b of the other spacer 4 by the latching portion 26.

In this state, when the one spacer 4 is slid so as to relatively move to the other spacer 4, the fitting convex portion 36 fits with the fitting concave portion 37. Accordingly, plate surfaces 4a and 4b of the spacers 4 and 4 come into close contact with each other, and the extending portion 26b and the fitting concavity 27b contact. As a result, the spacers 4 and 4 are fixed to each other so as not to move. At this time, peripheral portion of each electrode plate 3 is covered by adjacent spacer 4. Thus, each electrode plate 3 is held so as not to move inside the concavity 25 of the spacer 4 into which each electrode plate 3 is fitted.

Figure 8:
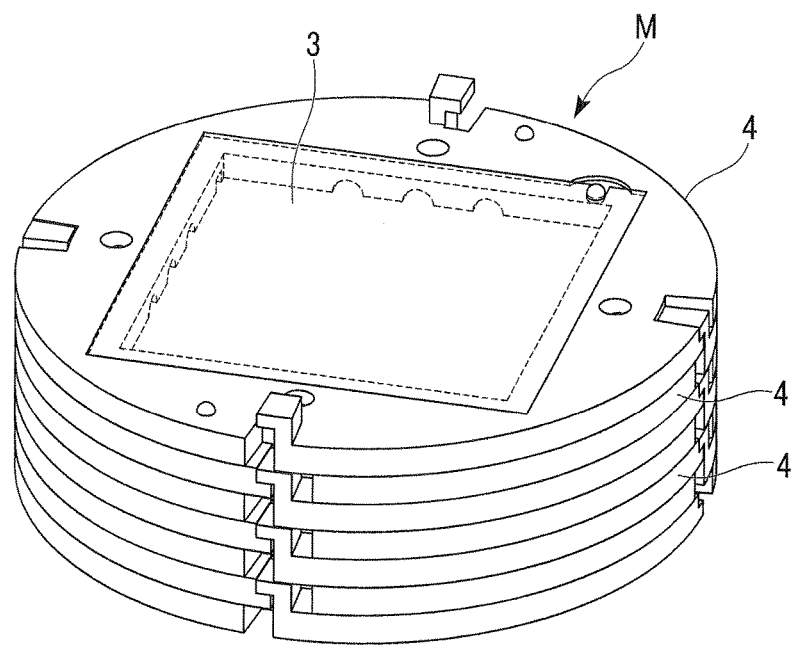
FIG. 8 is a perspective view illustrating a connected state of the electrode plate and the spacer of the bipolar-electrode electrolytic cell illustrated as the first embodiment of the invention.

As described above, a connected body M of the spacers 4, 4 . . . is obtained in which the electrode plate 3 illustrated in FIG. 8 is assembled by sequentially connecting the spacers 4 and 4.

Then, as illustrated in FIG. 2, the electrode bar 21A fixed to the electrode plate 3 which is the nearest to the side plate 5A passes through the electrode through hole 7 of the side plate 5A, and the electrode bar 21B fixed to the electrode plate 3 which is the nearest to the side plate 5B passes through the electrode through hole 7 of the side plate 5B. Then, the electrode plate 3 which is nearest to the side plate 5B is inserted into the concavity 25 of the spacer 4 positioned one end side of the connected body M, and the body 6 is covered on the connected body M, and the side plate 5A is aligned so that the supplying hole 8 and the liquid through hole 28 communicate with each other. Then, in a state where a washer 43 and a spring washer 44 are interposed on the male thread portion 23 of each of electrode bars 21A and 21B, a nut 45 is fastened. Accordingly, the side plate 5A, the body 6, the side plate 5B, and the spacers 4, 4 . . . are firmly fixed. In addition, the electrode plate 3 which is nearest to the side plate 5A is fitted inside the concavity 13 of the side plate 5A.

In the above configuration, the liquid through holes 28 of each spacer 4 communicate with each other. In addition, the liquid through hole 28 of the liquid through holes 28 communicating with each other, which is positioned on the lower side thereof, communicates with the supplying hole 8 of the side plate 5A, and the liquid through hole 28 positioned on the upper side thereof communicates with the extracting hole 9 of the side plate 5B.

In addition, the hollow hole 24 of each spacer 4 is covered by two sheets of the adjacent electrode plates 3 and 3 and then a space is formed. The inside of the space is the unit cell C in which the electrolyte solution is electrolyzed.

In addition, the flow passage 30 of each spacer 4 is covered by the adjacent spacer 4 and the electrode plate 3 which is fitted into the spacer 4. Accordingly, the flow passage 30 is a fluid passage communicating the liquid through hole 28 and the inside of the hollow hole 24.

In addition, the liquid through hole 28 and the flow passage 30 communicating with the liquid through hole 28 which are positioned on both sides of the right and left of the spacer 4, other than the liquid through holes 28 and 28 communicating with the supplying hole 8 and the extracting hole 9, are covered by the adjacent spacer 4 and the electrode plate 3 fitted into the spacer 4. Accordingly, the flow passage 30 is a fluid passage communicating with the inside of the liquid through hole 28 and the inside of the hollow hole 24. As a result, the insides of the hollow holes 24 of each spacer 4 communicate with each other.

Next, production of the electrolyzed products in the bipolar-electrode electrolytic cell 1 described above will be described referring to FIG. 2. First, the electrolyte solution is supplied to the supplying hole 8. The electrolyte solution is flowed into the liquid through hole 28 provided on the lower side of each spacer 4 and flowed into the unit cell C through the flow passage 30 of each spacer 4 so that the spacers 4 communicate with each other. When the electrolyte solution reaches a predetermined amount inside the unit cell C, electricity is applied between the electrode bars so that the electrode bars 21A and 21B are the anode and the cathode, respectively. As a result, the electrolyte solution is electrolyzed on the one plate surface 3a of the electrode plate 3, and the electrolyzed products of a turbid state of a gas such as chlorine and a liquid inside the unit cell C, or the electrolyzed products which is mainly formed from chlorine or the like, are provided. The electrolyzed products reach inside the liquid through hole 28 of the upper side thereof configuring the outlet from the inside of the unit cell C via the flow passage 30 of each spacer 4, and the electrolyzed products are extracted through the extracting hole 9.

In this case, as described above, the plate surface 3b of the electrode plate 3 on which the coating is not applied is disposed so as to necessarily oppose the bottom surface y of the concavity 25 of the spacer 4. In other words, when the electricity is applied between the electrode bars 21A and 21B as described above, the one plate surface 3a on which the coating is applied for the anode is always the plus side, and normal electrolysis can be performed because chlorine is generated on the plate surface 3a. In addition, reduction of the electrolysis efficiency of the bipolar-electrode electrolytic cell 1 can be prevented over a long period.

As described above, according to the bipolar-electrode electrolytic cell 1, since the projecting part 35 and the cut-out portion 10A are positioned at the corresponding positions each other when the other plate surface 3b of the electrode plate 3 is opposite to the bottom surface y of the concavity 25, the electrode plate 3 can be positioned inside the concavity 25. On the other hand, since the projecting part 35 and the cut-out portion 10A are not positioned at the corresponding positions of each other when the one plate surface 3a of the electrode plate 3 is opposite to the bottom surface y of the concavity 25, the positions thereof are not aligned to each other, and the disposition of the electrode plate 3 inside the concavity 25 is prevented. In other words, the electrode plate 3 cannot be assembled in the spacer 4 in a direction which is opposite to a predetermined direction. Accordingly, since the front and rear sides of the electrode plate 3 are distinguished each other, the electrode plate 3 is not disposed on the spacer 4 in a wrong direction. Thus, wrong assembly of the electrolytic cell can be prevented so that normal electrolysis can be performed.

In addition, since determination of the direction of the electrode plate 3 is easily performed, the assembly of the bipolar-electrode electrolytic cell 1 can be performed simply and efficiently.

In addition, in the first embodiment, the latching portion 26 and the latched portion 27 are provided, and the fitting convex portion 36 and the fitting concave portion 37 are formed on the spacer 4. Thus, the connection of the spacers 4 and 4 between each other can be performed simply, and the connection state can be made firm.

Modification Example

Figure 9A:
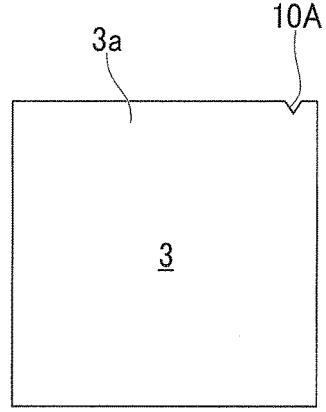
FIG. 9A is a view illustrating a modification example of the electrode plate of the bipolar-electrode electrolytic cell illustrated as the first embodiment of the invention, and is a front view of the electrode plate.
Figure 9B:
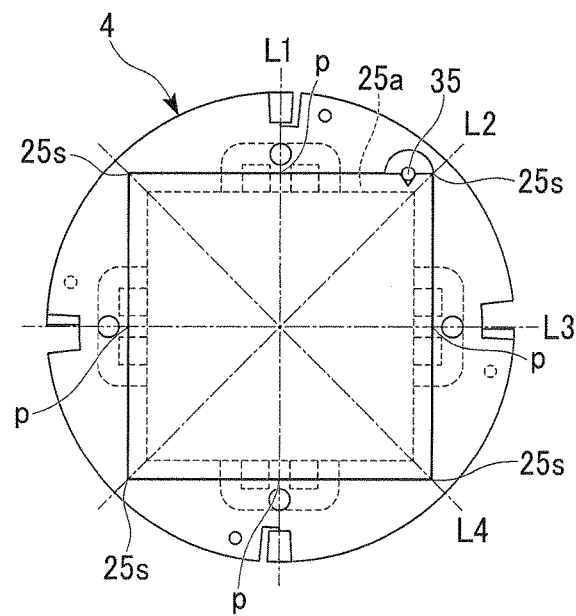
FIG. 9B is a view illustrating a modification example of the spacer of the bipolar-electrode electrolytic cell illustrated as the first embodiment of the invention, and is a front view of the spacer into which the electrode plate is illustrated in FIG. 9A.

In addition, in the first embodiment, the cut-out portion 10A is formed so that the shape of the peripheral portion is in substantially a U shape. However, the invention is not limited to the embodiment. For example, as illustrated in FIGS. 9A and 9B, the shape of the peripheral portion of the cut-out portion 10A may be formed so as to be substantially a V shape, and may be formed in other polygonal. In brief, the cut-out portion 10A surrounds the outer periphery of the projecting part 35, and may be open to the outside of one end periphery of the electrode plate 3.

In addition, the projecting part 35 is not necessarily formed on the right end portion of the concave portion 25a which is positioned on the upper portion side of the concavity 25 of the spacer 4. If the projecting part 35 is not formed on imaginary center lines L1 to L4 (in other words, lines bisecting the outer periphery of the concavity 25 so as to be the line symmetry) passing points p and p which bisect corner portions 25s and 25s of the concavity 25 or one side of the concavity 25, the projecting part 35 may form on any position of the concavity 25.

In other words, if the projecting part 35 is formed on the imaginary center lines L1 to L4, the electrode plate 3 can be disposed on the concavity 25, because the electrode plate 3 having the cut-out portion 10A, which is fitted into the projecting part 35, is positioned such that the projecting part 35 and the cut-out portion 10A correspond to each other even though any one of the plate surfaces 3a and 3b is directed to the spacer 4. On the other hand, when the projecting part 35 is formed on a position which is shifted from the imaginary center lines L1 to L4 and the cut-out portion 10A of the electrode plate 3 is formed so as to surround the projecting part 35, the forming position of the cut-out portion 10A when the one plate surface 3a of the electrode plate 3 is viewed in a plan view, and the forming position of the cut-out portion 10A when the other plate surface 3b is viewed in a front view, are not always aligned to each other. In other words, the one plate surface 3a of the electrode plate 3 can be always disposed in one direction on the spacer 4.

Second Embodiment

Next, a second embodiment of the invention will be described referring to FIGS. 10A to 10D. In the second embodiment, the same reference numeral is given to the same configuration of the first embodiment and the description thereof will be omitted. In addition, in the bipolar-electrode electrolytic cell 1 of the second embodiment, a shape of a cut-out portion 10B of the electrode plate 3 is different from the first embodiment. Besides that, the configuration of the second embodiment is the same as the first embodiment.

The cut-out portion 10B of the second embodiment is formed such that an angle portion 3s of the electrode plate 3 corresponding to the projecting part 35 of the spacer 4 is cut in a straight shape when the one plate surface 3a of the electrode plate 3 is viewed from a front view. Two angles $\theta 1$ and $\theta 2$ formed on the electrode plate 3 are formed to be different from each other by the cutting. The shapes of the electrode plates 3 are different from each other by such an electrode plate 3, between a case where the one plate surface 3a of the electrode plate 3 is directed in one direction and a case where the other plate surface 3b of the electrode plate 3 is directed in one direction.

Figure 10A:
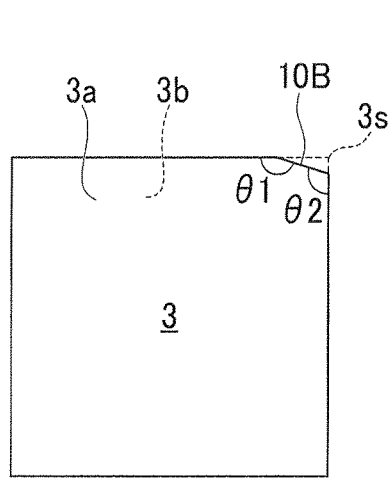
FIG. 10A is a view illustrating the electrode plate of the bipolar-electrode electrolytic cell illustrated as a second embodiment of the invention, and is a front view of the electrode plate.
Figure 10B:
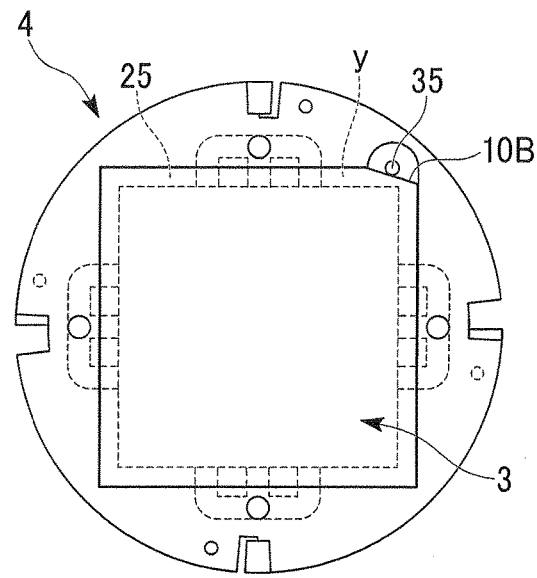
FIG. 10B is a view illustrating the spacer of the bipolar-electrode electrolytic cell illustrated as the second embodiment of the invention, and is a front view of the spacer into which the electrode plate is fitted illustrated in FIG. 10A.
Figure 10C:
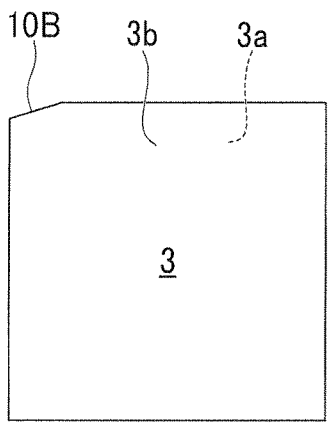
FIG. 10C is a view illustrating the electrode plate of the bipolar-electrode electrolytic cell illustrated as the second embodiment of the invention, and is a rear view of the electrode plate.
Figure 10D:
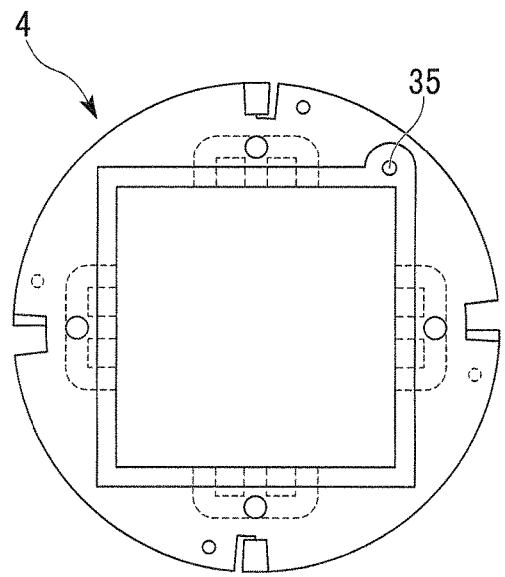
FIG. 10D is a view illustrating the spacer of the bipolar-electrode electrolytic cell illustrated as the second embodiment of the invention, and is a front view of the spacer.

Accordingly, similar to the above first embodiment, as illustrated in FIGS. 10A and 10B, only when the other plate surface 3b of the electrode plate 3 is opposite to the bottom surface y of the concavity 25, the projecting part 35 and the cut-out portion 10B are positioned on the portions corresponding to each other, and the electrode plate 3 can be disposed inside the concavity 25. On the other hand, as illustrated in FIGS. 10C and 10D, when the electrode plate 3 is assembled to the spacer 4 in a direction opposite to a predetermined direction, a portion which is fitted into the projecting part 35 of the cut-out portion 10B is shifted from the position of the projecting part 35, and the electrode plate 3 is fitted into the projecting part 35 and then cannot be fitted into the concavity 25.

Accordingly, also in the second embodiment, similar to the above first embodiment, only when the other plate surface 3b of the electrode plate 3 is opposite to the concavity 25, the electrode plate 3 can be disposed on the spacer 4. Accordingly, the same functions and effects as those of the above first embodiment can be obtained.

Third Embodiment

Next, a third embodiment of the invention will be described referring to FIGS. 11A to 11D. In the third embodiment, the same reference numeral is given to the same configuration of the first embodiment and the description thereof will be omitted. In addition, in the bipolar-electrode electrolytic cell 1 of the third embodiment, the configuration thereof is different from the first embodiment in that the engaging portion is not cut out and is a hole 40 into which the projecting part 35 is fitted. Besides that, the configuration thereof is similar to the first embodiment.

In the third embodiment, the hole 40 has a diameter slightly larger than the diameter of the circle column of the projecting part 35, and the projecting part 35 can be fitted into the hole 40.

Figure 11A:
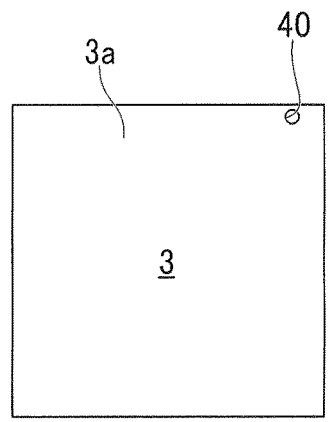
FIG. 11A is a view illustrating the electrode plate of the bipolar-electrode electrolytic cell illustrated as a third embodiment of the invention, and is a front view of the electrode plate.
Figure 11B:
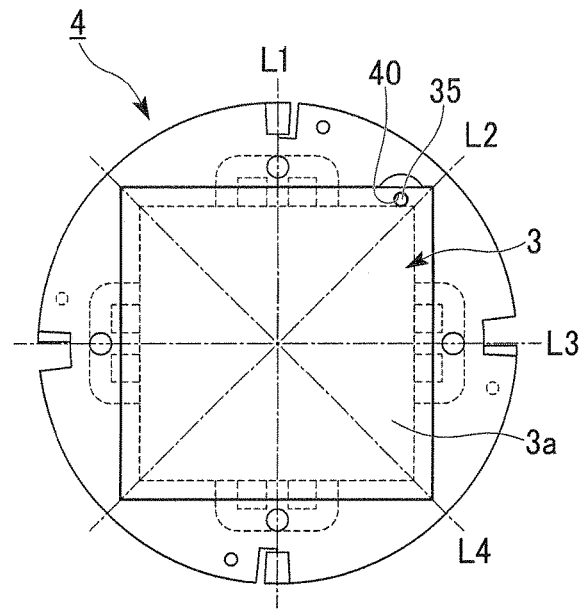
FIG. 11B is a view illustrating the spacer of the bipolar-electrode electrolytic cell illustrated as the third embodiment of the invention, and is a front view of the spacer fitted into the electrode plate illustrated in FIG. 11A.
Figure 11C:
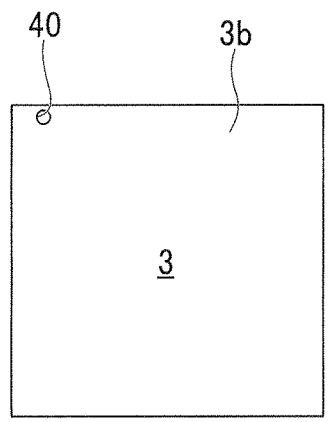
FIG. 11C is a view illustrating the electrode plate of the bipolar-electrode electrolytic cell illustrated as the third embodiment of the invention, and is a rear view of the electrode plate.
Figure 11D:
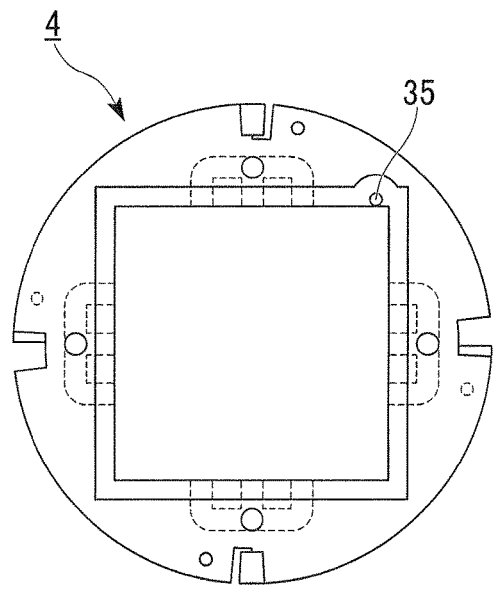
FIG. 11D is a view illustrating the spacer of the bipolar-electrode electrolytic cell illustrated as the third embodiment of the invention and is a front view of the spacer.
Figure 12A:
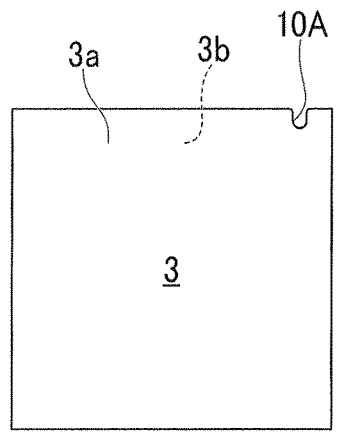
FIG. 12A is a view illustrating a modification example of the electrode plate of the bipolar-electrode electrolytic cell illustrated as the first embodiment of the invention, and is a front view of the electrode plate.
Figure 12B:
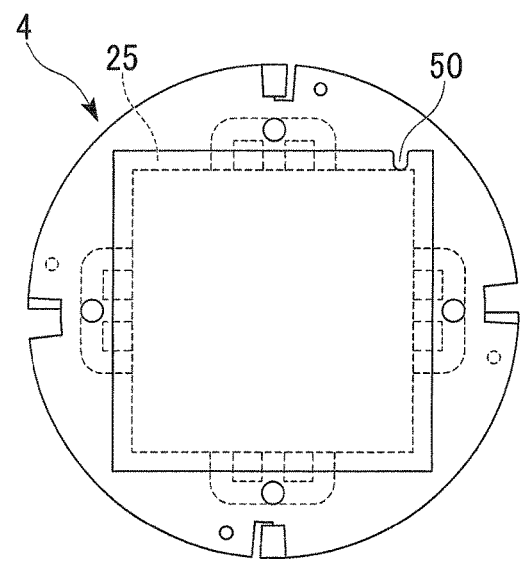
FIG. 12B is a view illustrating a modification example of the spacer of the bipolar-electrode electrolytic cell illustrated as the first embodiment of the invention, and is a front view of the spacer into which the electrode plate is fitted illustrated in FIG. 12A.
Figure 13A:
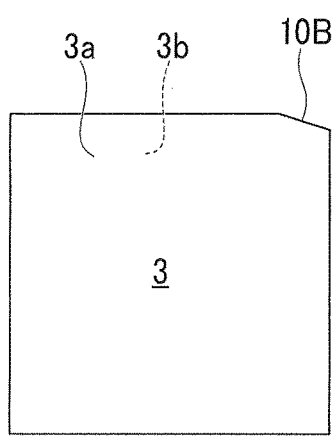
FIG. 13A is a view illustrating a modification example of the electrode plate of the bipolar-electrode electrolytic cell illustrated as the second embodiment of the invention, and is a front view of the electrode plate.
Figure 13B:
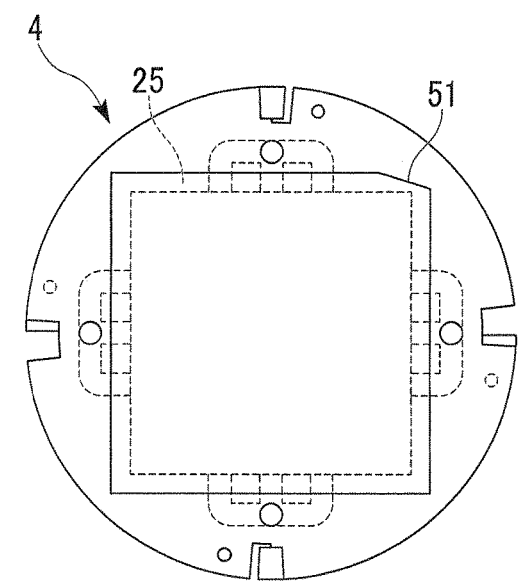
FIG. 13B is a view illustrating a modification example of the spacer of the bipolar-electrode electrolytic cell illustrated as the second embodiment of the invention, and is a front view of the spacer into which the electrode plate is fitted illustrated in FIG. 13A.

As illustrated in FIGS. 11A and 11B, in the third embodiment, the projecting part 35 is formed so as not to position on the imaginary center lines L1 to L4. Furthermore, when the other plate surface 3b is disposed opposite to the bottom surface y of the concavity 25 of the spacer 4, the hole 40 of the electrode plate 3 is formed on a position into which the projecting part 35 is fitted. Accordingly, in the case described above, the projecting part 35 is fitted into the hole 40, and the electrode plate 3 can be disposed on the concavity 25. However, as illustrated in FIGS. 11C and 11D, when the one plate surface 3a is disposed to be opposite to the bottom surface y of the concavity 25, since the position on which the hole 40 is formed is shifted from the position of the projecting part 35, the electrode plate 3 is prevented from fitting into the concavity 25. Accordingly, also in the third embodiment, similar to the first and second embodiments, only when the other plate surface 3b of the electrode plate 3 is opposite to the concavity 25, the electrode plate 3 can be disposed on the spacer 4. Thus, the same effects as that of the first embodiment can be obtained.

In addition, in the first embodiment, the modification examples thereof and the second embodiment, the engaged portion is the projecting part 35 and any of the electrode plate 3 having the cut-out portion 1 OA or the electrode plate 3 having the cut-out portion 10B can be applied to the spacer 4 including the projecting part 35. However, as illustrated in FIGS. 12A and 12B, and FIGS. 13A and 13B, for example, the latched portion may be a projecting wall 50 or 51 fitted into the cut-out portion 10A or 10B, instead of the projecting part 35. Even in a case when the engaged portion is the projecting wall 50 or 51, only when the electrode plate 3 is directed in one direction, the electrode plate 3 can be disposed on the concavity 25. Thus, the same functions and effects as those of the above first and second embodiments can be obtained.

INDUSTRIAL APPLICABILITY

According to the bipolar-electrode electrolytic cell of the invention, corrosion of the electrode plate can be avoid due to an wrong disposition of the electrode plate, and decrease of the electrolysis efficiency of the bipolar-electrode electrolytic cell in the early stage can be avoid. In addition, peeling of the coating of the electrode plate can be avoided, and the short life of the electrode plate is prevented.

In addition, according to the bipolar-electrode electrolytic cell of the invention, the electrolysis efficiency of the bipolar-electrode electrolytic cell can be maintained for a long period.

In addition, according to the bipolar-electrode electrolytic cell of the invention, since the direction of the electrode plate can be easily determined, the assembly of the bipolar-electrode electrolytic cell can be performed simply and efficiently.

REFERENCE SIGNS LIST

1 bipolar-electrode electrolytic cell
2 chassis
3 electrode plate
3a one plate surface
3b other plate surface
4 spacer
10A, 10B cut-out portion (engaging portion)
25 concavity
26 latching portion
27 latched portion
35 projecting part (engaged portion)
36 fitting convex portion
37 fitting concave portion
40 hole (engaging portion)
50, 51 projecting wall (engaged portion)
C unit cell

The invention claimed is:

1. A bipolar-electrode electrolytic cell which includes a chassis, an electrode plate performing electrolysis in electrolyte solution and generating electrolyzed products, and a plate-shaped spacer having a concavity on which the electrode plate is disposed, and in which an unit cell, which is formed by connecting a plurality of spacers in which a plurality of electrode plates are respectively disposed on a plurality of concavities in such a manner that one plate surface of the electrode plate is directed to one direction, is disposed inside the chassis,
  wherein the spacer has a latching portion formed on a plate surface of the spacer and a latched portion which is configured to latch a latching portion of an another spacer and perform connection thereto,
  wherein the latching portion includes a rising wall portion which rises from a plate surface of the spacer and an extending portion which protrudes in an outer periphery direction of the spacer from the rising wall portion so as to be parallel to the plate surface of the spacer,
  the latched portion includes a concave portion which is configured that the latching portion enters the latched portion and a fitting concavity which is adjacent to the concave portion on one side thereof in the outer periphery direction of the spacer and recessed in a thickness direction of the spacer,
  the latching portion of the spacer is configured to enter a concave portion of the latched portion of the another spacer in the thickness direction of the spacer,
  a front end of the extending portion of the latching portion is configured to be latched on a front end of the fitting concavity of the latched portion,
  the spacer is configured to slide so as to relatively move to the another spacer in the outer periphery direction thereof,
  the latching portion of the spacer and the latched portion of the another spacer are configured to contact each other via the sliding so that the spacer and the another spacer are fixed to each other so as not to move,
  wherein the latching portion includes two latching portions respectively formed at first positions facing each other on a periphery portion of the spacer,
  the latched portion includes two latched portions respectively formed at second positions facing each other on the periphery portion of the spacer, and
  the first positions are deviated from the second positions by 90 degrees.

2. The bipolar-electrode electrolytic cell according to claim 1, further comprising:
  an engaged portion which is provided on any one side of the concavity of the spacer and the electrode plate; and
  an engaging portion which is formed on the other side with respect to the one side, wherein the engaged portion and the engaging portion are positioned so as to correspond to each other, and are formed to dispose the electrode plate inside the concavity, when the one plate surface of the electrode plate is disposed on the concavity toward the one direction, and wherein the engaged portion and the engaging portion are positioned so as not to correspond to each other, and are prevented from disposing the electrode plate inside the concavity, when the other plate surface of the electrode plate is disposed on the concavity toward the one direction.

3. The bipolar-electrode electrolytic cell according to claim 2, wherein the engaged portion is a projecting wall or a projecting part formed on the concavity, and wherein the engaging portion is a cut-out portion or a hole formed on the electrode plate.

4. The bipolar-electrode electrolytic cell according to any one of claims 1, 2, and 3, wherein a fitting convex portion is formed on the plate surface of the spacer, and a fitting concave portion, which is configured to be fitted into a fitting convex portion of the plate surface of the another spacer and holds the connection between the spacer and the another spacer, is formed on the other plate surface of the spacer.

5. The bipolar-electrode electrolytic cell according to claim 1, wherein the spacer has a hollow hole which passes through a center portion of the plate surface of the spacer in the thickness direction of the spacer, and the hollow hole is formed in a square shape.

6. The bipolar-electrode electrolytic cell according to claim 1, the concave portion is a notch formed on the periphery portion of the spacer.

\* \* \* \* \*